United States Patent [19]

Lin et al.

[11] Patent Number: 5,035,745

[45] Date of Patent: Jul. 30, 1991

[54] ION-EXCHANGED ABRASION RESISTANT COATINGS

[75] Inventors: Chia-Cheng Lin, Gibsonia; John D. Basil, Pittsburgh; Robert M. Hunia, Kittanning, all of Pa.

[73] Assignee: PPG Industries, Inc., Pittsburgh, Pa.

[21] Appl. No.: 546,076

[22] Filed: Jun. 29, 1990

[51] Int. Cl.$^5$ .................... C09K 3/00; C04B 14/00
[52] U.S. Cl. .................. 106/287.16; 106/287.12; 106/287.13; 106/287.14; 106/287.17; 106/287.18; 106/287.19
[58] Field of Search ............ 106/287.14, 287.16, 106/287.17, 287.19, 634, 287.12, 287.13, 287.18

[56] References Cited

U.S. PATENT DOCUMENTS

| | | | |
|---|---|---|---|
| 3,867,304 | 2/1975 | Mindick et al. | 106/287.34 |
| 4,275,118 | 6/1981 | Baney et al. | 106/287.16 |
| 4,390,373 | 6/1983 | White et al. | 106/287 |
| 4,405,679 | 8/1983 | Fujioka et al. | 428/216 |
| 4,442,168 | 4/1984 | White et al. | 428/331 |
| 4,477,499 | 10/1984 | Doin et al. | 427/412 |
| 4,500,669 | 2/1985 | Ashlock et al. | 524/440 |
| 4,571,365 | 2/1986 | Ashlock et al. | 428/412 |
| 4,624,800 | 11/1986 | Sasaki et al. | 106/287.34 |
| 4,799,963 | 1/1989 | Basil et al. | 106/287.24 |

*Primary Examiner*—Theodore Morris
*Assistant Examiner*—David M. Brunsman
*Attorney, Agent, or Firm*—Donna L. Seidel

[57] ABSTRACT

An abrasion resistant and ultraviolet radiation resistant coating is disclosed comprising an inorganic oxide matrix formed by the hydrolysis and condensation of an alkoxysilane and/or other metal alkoxide, further comprising cerium oxide for ultraviolet radiation resistant and/or silica for improved abrasion resistance. A partially hydrolyzed silane sol containing colloidal cerium oxide is ion-exchange with an anion exchange resin in one embodiment. In another a partially hydrolyzed silane sol containing colloidal silica is ion-exchanged to remove sodium ions prior to adding the colloidal ceria resulting in improved properties in the coating composition and resultant coating.

18 Claims, No Drawings

ION-EXCHANGED ABRASION RESISTANT COATINGS

FIELD OF THE INVENTION

The present invention relates generally to protective coatings for plastics such as polycarbonate, and more particularly to compositions of silica/alkoxysilanes with improved flow properties and adhesion which produce coatings with improved abrasion resistance and durability and lower initial haze.

BACKGROUND OF THE INVENTION

U.S. Pat. No. 4,275,118 to Baney et al. discloses a coating composition comprising an acidic dispersion of colloidal titania, colloidal silica and hydroxylated silsesquioxane in an alcohol-water medium which produces a hard, abrasion-resistant coating when cured on a plastic surface such as polycarbonate.

U.S. Pat. Nos. 4,390,373 and 4,442,168 to White et al. disclose a cured transparent, abrasion resistant coating composition comprising an effective abrasion resisting amount of colloidal dispersion containing colloidal antimony oxide and colloidal silica in a weight rate of less than or equal to about 30:70 in a water-alcohol solution of the partial condensate of R (Si(OH)$_3$) wherein R is an organic radical.

U.S. Pat. No. 4,405,679 to Fujioka et al. discloses a coated shaped article of a polycarbonate type resin of improved abrasion resistance comprising a shaped polycarbonate substrate, an undercoat applied and cured on the substrate, and an overcoat applied and cured on the undercoat comprising a hydrolyzate of an epoxy-containing silicon compound, at least one member of the group of hydrolyzates of organic silicon compounds, colloidal silica and organic titania compounds, and a curing catalyst.

U.S. Pat. No. 4,477,499 to Doin et al. discloses ultraviolet radiation resistant silicone resin coatings having improved thermoformability and shortened required aging achieved by the addition of a Lewis acid compound to the coating composition.

U.S. Pat. Nos. 4,500,669 and 4,571,365 to Ashlock et al. disclose transparent, abrasion resistant coating compositions comprising a colloidal dispersion of a water insoluble dispersant in a water-alcohol solution of the partial condensate of silanol wherein the dispersant comprises metals, alloys, salts, oxides and hydroxides thereof.

European Patent Application No. 851102939 published 05.02.86 entitled "Carbon-Containing Monolithic Glasses Prepared by a Sol-Gel Process" by Baney et al. of Dow Corning Corporation discloses a valuable intermediate which comprises a dispersion of a colloidal metal oxide in a water-alcohol solution of the partial condensate of a silanol having the formula RSi(OH)$_3$, wherein the metal oxide is $ZrO_2$, $SnO_2$, $ZrSiO_4$, $B_2O_3$ or $La_2O_3$.

Optical quality abrasion resistant coated plastic materials generally require a coating that protects the substrate from the damaging effects of ultraviolet (UV) radiation. Protection from ultraviolet radiation is especially important for polycarbonate, since hydrolytic degradation is apparently accelerated by UV exposure. Conventional UV stabilizers do not impart sufficient protective capacity to abrasion resistant coatings, as sufficient amounts of most typical organic UV absorbers cannot be added to abrasion resistant coatings without adversely affecting hardness and adhesion of the coating. Moreover, typical UV absorbers may gradually become deactivated after prolonged exposure, and also may gradually be leached from the composition.

In *Physics of Thin Films*, Vol. 5, in "Oxide Layers Deposited From Organic Solutions," Schroder notes that titanium, cerium, antimony, and lead oxides deposited from organic solutions exhibit a steep rise of absorption in the near ultraviolet range of the radiation spectrum, and in the *Journal of Applied Polymer Science*, Vol. 26, in "Inhibition of Photoinitiated Degradation of Polycarbonate by Cerium (III) Overcoating," Klein et al. disclose coating a polycarbonate substrate with cerous chloride ($CeCl_3$/poly(vinyl alcohol) complex.

SUMMARY OF THE INVENTION

The present invention provides abrasion resistance for underlying plastic substrates such as polycarbonate, as well as protection from damaging ultraviolet radiation by means of transparent coatings containing silica and/or cerium oxide, from ion-exchanged aqueous sols formed from aqueous sols containing colloidal silica and/or cerium oxide in addition to alkoxides of silicon and/or other metals which hydrolyze and polymerize by condensation to form a film in which the silica and/or cerium oxide is incorporated in the oxide network of the coating. Removal of sodium ions from silane/silica coating solutions with cation exchange resins in the hydrogen-ion form improves the flow characteristics and adhesion of the coating solution, and improves the abrasion resistance and durability of the cured coating. Further ion exchange of coating solutions containing cerium oxide with resins in the hydroxyl ion form produces solutions which form coating having lower initial haze.

DESCRIPTION OF THE PREFERRED EMBODIMENT

Sol-gel coating compositions which form optically transparent UV-protective coatings are taught in U.S. Pat. No. 4,799,963 to Basil et al., the disclosure of which is incorporated herein by reference. Similar compositions comprising the reaction product of cerium oxide and tetraethylorthosilicate are taught in U.S. application Ser. No. 07/300,663 filed Jan. 23, 1989, the disclosure of which is incorporated herein by reference. The present invention improves the properties of such compositions by ion-exchange techniques. First, removal of sodium ions from silica sols by cation exchange resins in the hydrogen ion (H+) form improves the flow and adhesion of the coating solution, and improves the durability and abrasion resistance of the cured coating. Second, after adding aqueous colloidal ceria sol to a partially hydrolyzed alkoxysilane sol, particularly a sodium-depleted silane-silica coating composition, anion exchange with resin in the hydroxyl ion (OH) form produces a solution which forms coatings with lower initial haze.

Coatings that protect plastic substrates such as polycarbonate from damage caused by ultraviolet radiation are formed from aqueous sols containing colloidal cerium oxide and a network-forming metal alkoxide such as alkoxysilanes and other metal alkoxides. The sols may further comprise collodial silica for additional abrasion resistance. The alkoxysilane may be an organoalkoxysilane, such as an alkylalkoxysilane or organofunctional alkoxysilane. The alkoxide may contain alkyl or aryl groups and may be in dimer or higher condensed form so long as hydrolyzable alkoxide groups remain. The alkoxide may be added directly to an aqueous cerium oxide sol, with or without additional solvent such as alcohol. Hydrolysis and condensation polymerization occur in situ. Alternatively, the alkoxide may be partially or fully hydrolyzed, and condensed to some extent prior to combination with the cerium oxide sol. In accordance with the present invention, a silane/silica sol is treated with a cation exchange resin in the hydrogen ion form to remove sodium ions prior to adding the ceria sol. This ion exchange process produces a sol with better flow characteristics and improved adhesion to the substrate.

The resulting silane/silica/ceria sol may be used as a coating composition for either a primer or protective overcoat on a substrate or coated substrate. Or, the silane/silica/ceria sol may be added to other coating compositions to increase their resistance to ultraviolet radiation. In either case, the coating compositions may be applied by any conventional technique, such as spraying, dipping or flow coating. The composition dries and cures to form a uniform durable coating with good adhesion to plastic substrates such as polycarbonate. The coating protects the substrate from ultraviolet radiation by providing a strong, broad absorption band in the 240 to 280 nanometer range. In accordance with the present invention, the silane/silica/ceria sol is preferably further treated with anion exchange resin in the hydroxyl form to produce a solution which forms coatings with lower initial haze.

In a preferred embodiment of the present invention, an alkoxide is partially hydrolyzed and cation exchanged before adding an aqueous sol of colloidal cerium oxide. Preferably, the alkoxide is an alkoxysilane of the general formula $R_xSi(OR')_{4-x}$ wherein R is an organic radical, R' is selected from the group consisting of low molecular weight alkyl radicals, and x is less than 4 and may be zero. The organic radical of R is preferably alkyl, vinyl, methoxyethyl, phenyl, γ-glycidoxypropyl, or γ-methacryloxypropyl. The alkoxide hydrolyzes according to the general reaction $$R_xSi(OR')_{4-x} + yH_2O \rightarrow R_xSi(OR')_{4-x-y}(OH)_y + yR'OH.$$

Condensation of the hydrolyzed alkoxide proceeds according to the general reactions

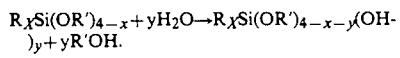

or

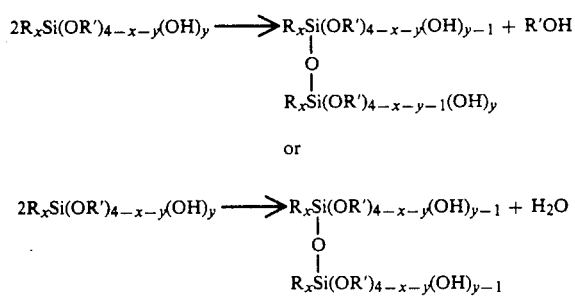

Further hydrolysis and condensation follow. The alkoxysilane sol may further comprise colloidal silica for additional abrasion resistance. The colloidal silica is preferably an aqueous dispersion.

A silane-silica sol is treated with cation exchange resin in the hydrogen ion form to remove sodium ions prior to adding the cerium oxide. The cerium oxide sol preferably comprises about 10 to 30 percent by weight colloidal cerium oxide in water, with the colloidal cerium oxide particle size sufficiently small to minimize scattering of visible light, preferably less than 30 to 40 nanometers, most preferably less than 10 nanometers. Alkoxides of titanium and/or zirconium may also be included in compositions of the present invention. The ultraviolet radiation protection provided by the cerium oxide containing coating of the present invention may be determined by measuring the UV absorbance spectrum of the coating applied on a quartz substrate.

The present invention will be further understood from the descriptions of specific examples which follow.

EXAMPLE I

A transparent polycarbonate substrate is treated with an acrylic primer containing a UV absorber (SP-1 sold by Exxene containing 15 percent Cyabsorb). The primed polycarbonate is then dip-coated in a composition prepared as follows.

To 30.0 grams of silica sol is added 2.0 grams of acetic acid. The silica sol is an aqueous dispersion of 30 percent colloidal silica having an average particle size of 12 nanometers, containing 0.4 percent sodium and having a pH of 10.2, available as Nalcoag 1030 from Nalco Chemical. The acidified silica sol is then added to a mixture of 55.0 grams of methyltriethoxysilane and 5.5 grams of dimethyldiethoxy silane. Hydrolysis is allowed to proceed for 24 hours at ambient temperature. The resultant reaction product is diluted from 44.8 to 35 percent solids with isopropanol. The solution is centrifuged, and 100 grams of the decant is ion-exchanged with a mixture of 3.0 grams of cation exchange resin and 0.76 grams of anion exchange resin for 30 minutes. The cation exchange resin in this example is BioRAD ® AG 50W-X8, and the anion exchange resin is BioRad ® AG 1-X8. The pH of the composition after ion exchange is about 3.7. To the ion-exchanged composition is added 10.0 grams of ceria sol, an aqueous dispersion of 20 percent colloidal cerium oxide sold by Rhone-Poulenc. The final composition has a pH of about 3.2.

The acrylic-primed polycarbonate substrate is dip-coated in the ion-exchanged silane-silica-ceria sol, dried in air for 30 minutes and cured for 3 hours at 120° C. After 300 cycles of Bayer abrasion testing, the change in haze (% H) is 5.2 percent.

EXAMPLE II

Another 100 grams of the silane-silica/ceria sol of Example I is ion-exchanged with 0.76 grams of anion exchange resin for 15 minutes. To this ion-exchanged silane-silica sol is added 10.0 grams of colloidal ceria sol. The silane/silica/ceria sol is then ion-exchanged for 30 minutes with 3.0 grams of cation exchange resin. The final pH is about 3.2. This composition is dip-coated, dried and cured on acrylic-primed polycarbonate as in Example I. After 300 cycles of Bayer abrasion testing, the change in percent haze is 5.4.

EXAMPLE III

A sol is prepared by adding 270 grams of aqueous colloidal silica, 20.25 grams of water and 18 grams of glacial acetic acid to a mixture of 495 grams of methyltriethoxysilane and 49.5 grams of dimethyldiethoxysilane and stirring for 18 to 20 hours at ambient temperature. The sol is centrifuged, diluted to 35 percent solids with 337.5 grams of isopropanol and centrifuged again. A 1600 gram portion of the sol is first ion exchanged with 48 grams of BioRad ® Ag 50W-X8 resin for 30 minutes to a pH of 3.0. Then 160 grams of 20% aqueous colloidal ceria is added. The silane-silica-ceria sol is then ion-exchanged with 12.2 grams of BioRad ® 1-X8 resin for 15 minutes. To the ion-exchanged sol is added 8.8 grams of polyvinylpyrrolidone (PVP). The composition is filtered through 5 micron, 1.2 micron and finally 0.8 micron filters.

A polycarbonate sample is primed with a solution of 11.9 grams of Uvinol 400 in 1600 grams of Exxene ® SPI. Clean, dry polycarbonate sheets measuring $12'' \times 13'' \times \frac{1}{8}$ (30.48 × 33.02 × 0.3 centimeters) are dipped in the primer solution for one minute at ambient temperature and withdrawn at a rate of about 8 inches (20.32 centimeters) per minute. The primer is dried in air for 30 minutes and cured at 60° C. for 30 minutes. The primed polycarbonate is then likewise dip coated in the silane-silica-ceria sol. The composition was dried in air at ambient temperature for 15 minutes and cured at 120° C. for 3 hours. The coating has an initial transmittance of 91.5 percent and haze of 0.5 percent. After 300 cycles of Bayer abrasion testing, the increase in haze is 9.5 percent.

EXAMPLE IV

A solution of 4 grams of glacial acetic acid in 60 grams of silica sol is added to 10 grams of dimethyldiethoxysilane in 100 grams of methyltriethoxysilane, stirred at ambient temperature for 22 hours, diluted to 35 percent solids with 44.7 grams of isopropanol and centrifuged. The silane-silica sol is ion-exchanged with 2.0 grams of BioRad ® AG 1-X8 hydroxide form anion exchange resin for one hour to a pH of 5.0. A 50 gram portion of this solution is ion exchanged with 1.5 grams of BioRad ® AG 50-W-X8 hydrogen form cation exchange resin for 30 minutes before adding 5 grams of 20 percent aqueous ceria sol. Another ion exchange with 0.38 grams of BioRad ® AG 1-X8 for 15 minutes is followed by addition of 0.55 grams of polyvinylpyrrolidone (PVP-K15) and centrifuging. Priming, coating and curing are carried out as in the previous example. The cured coating has a thickness of 4.9 microns, transmittance of 91.4 percent and haze of 0.6–0.7 percent. After 300 cycles of Bayer abrasion, the haze is 6.6 percent.

The above examples are offered to illustrate the present invention. Various hydrolyzable alkoxides, silica dispersions and cerium oxide compositions may be combined in a wide range of proportions and concentrations, so long as there is sufficient alkoxide to form an oxide network and sufficient cerium oxide to provide desired improvement in ultraviolet radiation resistance, as measured by the UV absorbence spectrum of the coating on a quartz substrate. Various ion exchange resins may be used. Cerium oxide containing coatings are useful on a variety of substrates in accordance with the present invention, the scope of which is defined by the following claims.

We claim:

1. An optically transparent coating composition for protecting a substrate from ultraviolet radiation comprising an ion-exchanged reaction mixture which comprises
   a. a partially hydrolyzed alkoxide of the general formula $R_xM(OR')_{z-x}$ wherein R is an organic radical, M is selected from the group consisting of silicon, aluminum, titanium, zirconium and mixtures thereof, R' is a low molecular weight alkyl radical, z is the valence of M and x is less than z and may be zero; and
   b. a colloidal oxide selected from the group consisting of silica and cerium oxide and mixtures thereof.

2. A composition according to claim 1, wherein said alkoxide comprises the general formula $R_xSi(OR')_{4-x}$ and R' is selected from the group consisting of methyl, ethyl, propyl, and butyl.

3. A composition according to claim 2, wherein R is selected from the group consisting of alkyl, vinyl, phenyl, methoxyethyl, γ-glycidoxypropyl and γ-methacryloxypropyl, and x is 1.

4. A composition according to claim 3, wherein said alkoxide comprises methyl triethoxysilane.

5. A composition according to claim 3, wherein said alkoxide comprises γ-glycidoxypropyl trimethoxysilane.

6. A composition according to claim 1, wherein said cerium oxide comprises colloidal particles in aqueous dispersion.

7. A composition according to claim 1, further comprising silica.

8. A composition according to claim 7, wherein said silica comprises colloidal particles in aqueous dispersion.

9. A method of preparing an optically transparent abrasion resistant coating composition comprising the steps of:
   a. at least partially hydrolyzing an alkoxide of the general formula $R_xM(OR')_{z-x}$ wherein R is an organic radical, M is selected from the group consisting of silicon, aluminum, titanium, zirconium and mixtures thereof, R' is a low molecular weight alkyl radical, z is the valence of M and x is less than z and may be zero;
   b. adding colloidal silica to form a silane-silica sol; and
   c. ion-exchanging the silane-silica sol to remove sodium ions.

10. The method according to claim 9, wherein the coating composition is made resistant to ultraviolet radiation by the additional steps of:
   d. adding to said at least partially hydrolyzed alkoxide a colloidal dispersion of cerium oxide; and
   e. ion-exchanging the silane/silica/cerium oxide sol.

11. A method according to claim 10, wherein said alkoxide comprises the general formula $R_xSi(OR')_{4-x}$ and R' is selected from the group consisting of methyl, ethyl, propyl and butyl.

12. A method according to claim 11, wherein R is selected from the group consisting of alkyl, vinyl, phenyl, methoxyethyl, γ-glycidoxypropyl and γ-methacryloxypropyl, and x is 1.

13. A method according to claim 12, wherein said alkoxide comprises methyl triethoxysilane.

14. A method according to claim 12, wherein said alkoxide comprises γ-glycidoxypropyl trimethoxysilane.

15. A method according to claim 10, wherein said cerium oxide comprises colloidal particles in aqueous dispersion.

16. A method according to claim 15, wherein said particles have an average particle size of 5 to 15 microns.

17. A method according to claim 1, wherein said silica comprises colloidal particles in aqueous dispersion.

18. A method according to claim 17, wherein said silica particles have an average particle size of 10 to 20 microns.

* * * * *

UNITED STATES PATENT AND TRADEMARK OFFICE
CERTIFICATE OF CORRECTION

PATENT NO. : 5,035,745

DATED : July 30, 1991

INVENTOR(S) : Chia-Cheng Lin, John D. Basil and Robert M. Hunia

It is certified that error appears in the above-identified patent and that said Letters Patent is hereby corrected as shown below:

Column 6, claim 6, line 1, after "said" insert --colloidal oxide comprises--.

Column 6, claim 6, line 2, after "cerium oxide" delete "comprises".

Column 6, claim 6, line 2, after "cerium oxide" insert --in the form of--.

Column 6, claim 7, line 1, delete "1" and insert --6--.

Column 6, claim 7, line 1, after "claim 1," insert --wherein said colloidal oxide--.

Column 6, claim 7, lines 1-2, delete "comprising" and insert --comprises--.

Column 6, claim 17, line 1, delete "1" and insert --10--.

Signed and Sealed this

Tenth Day of November, 1992

Attest:

DOUGLAS B. COMER

*Attesting Officer*    *Acting Commissioner of Patents and Trademarks*